United States Patent
Kwon (10) Patent No.: US 9,452,664 B2
(45) Date of Patent: Sep. 27, 2016

(54) STRUCTURE OF SIDE LID FOR VEHICLE

(71) Applicant: Hyundai Motor Company, Seoul (KR)

(72) Inventor: Hyuk-Jong Kwon, Jeonju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/919,465

(22) Filed: Oct. 21, 2015

(65) Prior Publication Data

US 2016/0129770 A1   May 12, 2016

(30) Foreign Application Priority Data

Nov. 12, 2014  (KR) .................. 10-2014-0157129

(51) Int. Cl.
*B60J 5/04*          (2006.01)

(52) U.S. Cl.
CPC .............. *B60J 5/0491* (2013.01); *B60J 5/047* (2013.01); *B60J 5/0473* (2013.01)

(58) Field of Classification Search
CPC ...... B60J 5/0473; B60J 5/047; B60J 5/0487; B60J 5/0491; B60J 5/0498
USPC ............ 296/146.12, 97.22, 51; 49/193, 382; 16/231, 232
See application file for complete search history.

(56) References Cited

U.S. PATENT DOCUMENTS

| 5,357,652 A * | 10/1994 | Yamada | B60R 7/04 16/232 |
| 5,367,828 A * | 11/1994 | Hashemnia | B60J 5/047 49/193 |
| 5,761,849 A * | 6/1998 | Tokuno | B60J 5/101 16/268 |
| 2009/0139145 A1* | 6/2009 | Watanabe | E05D 15/502 49/193 |
| 2016/0046332 A1* | 2/2016 | Mantchev | B62D 33/037 296/51 |

FOREIGN PATENT DOCUMENTS

| CN | 2675818 Y | 2/2005 |
| EP | 1308375 A2 | 5/2003 |
| JP | 2000-175765 A | 6/2000 |
| JP | 3502968 B2 | 3/2004 |
| KR | 20-1998-0034562 Y1 | 9/1999 |
| KR | 10-2007-0059595 A | 6/2007 |
| KR | 10-0837009 B1 | 6/2008 |
| KR | 10-1392769 B1 | 4/2014 |
| KR | 10-1424554 B1 | 7/2014 |

\* cited by examiner

*Primary Examiner* — Jason S Morrow
(74) *Attorney, Agent, or Firm* — McDermott Will & Emery LLP (57) ABSTRACT

A structure of a side lid for an accommodating space formed in a vehicle body comprises an upper hinge assembly disposed at an upper portion of the side lid, and connected by a cable to an upper handle; and a lower hinge assembly disposed at a lower portion of the side lid, and connected by a cable to a lower handle, wherein the side lid is configured to be opened upward by the lower handle and downward by the upper handle.

4 Claims, 6 Drawing Sheets

STRUCTURE OF SIDE LID FOR VEHICLE

CROSS-REFERENCE TO RELATED APPLICATIONS

This application claims priority under 35 U.S.C. §119 to Korean Patent Application No. 10-2014-157129, filed on Nov. 12, 2014, in the Korean Intellectual Property Office, the entirety of which is incorporated herein by reference.

TECHNICAL FIELD

The present disclosure relates to a structure of a side lid that is mainly used for a freight vehicle, and more particularly, to a structure of a side lid for a vehicle, in which an upper handle and two upper hinge assemblies are mounted at an upper portion of the side lid, and a lower handle and two lower hinge assemblies are mounted at a lower portion of the side lid, such that the side lid may be selectively opened upward or downward.

BACKGROUND

In general, in the case of a freight vehicle such as a large-sized truck, an engine room is installed at a front side, and a cab, which defines an external appearance of a vehicle while closing the engine room and in which a driver may be seated, is mounted over the engine room.

In general, unlike a passenger vehicle, there is no separate trunk space in a large-sized truck, and an accommodating space for storing tools, which are used to inspect or repair the vehicle, contaminated articles, which are not suitable to be stored in the interior of the vehicle, miscellaneous articles, and the like is formed at the rear of a front door.

In order to prevent the articles accommodated in the accommodating space from getting out of the accommodating space while the vehicle travels and protect the articles accommodated in the accommodating space, a side lid is openably mounted at the accommodating space.

The side lid is opened or closed while being rotated by a hinge assembly, and widely classified into a forward open type side lid and an upward open type side lid based on a direction in which the side lid is opened.

In the case of the forward open type side lid, a hinge assembly is disposed at a left side or a right side of the side lid, such that the side lid is opened from the right side to the left side or from the left side to the right side. In the case of the upward open type side lid, a hinge assembly is disposed at an upper side of the side lid, such that the side lid is opened from a lower side to the upper side.

The forward open type side lid has an advantage in that a structure thereof is simple, but has a drawback in that the driver is inconvenienced when the driver intends to pick up articles in the driver seat in a state in which the side lid is opened because the side lid obstructs a traffic line of the driver.

The upward open type side lid has an advantage in that the upward open type side lid prevents rainwater from falling into the accommodating space on a rainy day and prevents the articles in the accommodating space from getting wet, but has a drawback in that a structure thereof is complicated.

In the case of the side lid in the related art, there is a problem in that there is no structure that may be used as a shelf regardless of the type of side lid, and as a result, a user is inconvenienced when the user holds articles with both hands or when the user intends to arrange the articles in the accommodating space after placing articles on the shelf.

SUMMARY

The present disclosure has been made in an effort to provide a structure of a side lid for a vehicle, by which a user may selectively open the side lid upward or downward, thereby allowing the user to conveniently use the side lid on a rainy day, and allowing the user to conveniently perform work after placing a light article on the side lid.

The present disclosure has also been made in an effort to provide a structure of a side lid for a vehicle, by which the user may perform work after completely removing the side lid when operating an upper handle and a lower handle simultaneously or sequentially, thereby allowing the user to conveniently perform work.

Technical problems to be achieved in the present inventive concept are not limited to the aforementioned technical problems, and any other not-mentioned technical problems will be obviously understood from the description below by those skilled in the technical field to which the present inventive concept pertains.

An exemplary embodiment of the present inventive concept provides a structure of a side lid for an accommodating space formed in a vehicle body comprising an upper hinge assembly disposed at an upper portion of the side lid, and connected by a cable to an upper handle; and a lower hinge assembly disposed at a lower portion of the side lid, and connected by a cable to a lower handle, wherein the side lid may be configured to be opened upward by the lower handle and downward by the upper handle.

At least one of the upper hinge assembly and the lower hinge assembly may include a female portion coupled to the side lid and comprising a shaft having a first end connected to the cable, the shaft being slidably accommodated in the female portion; and a male portion coupled to the vehicle body and having a through hole portion formed to accommodate the shaft.

A first inclined surface having an inclination angle may be formed at a second end of the shaft, and a second inclined surface having a shape corresponding to a shape of the first inclined surface may be formed at an end of the male portion.

The handle may include a handle portion rotatably connected, by a handle pin, to a first side of a fixing portion coupled to the side lid; and a lever portion coupled to a second side of the fixing portion by a lever pin so as to be rotated when the handle portion is rotated, and having an end connected to the cable.

A recess, having a shape corresponding to a shape of the lever portion, may be formed at one side of an extension portion that extends from the handle portion.

According to the present inventive concept, which has the aforementioned configurations, the user may open the side lid upward by operating the lower hinge assemblies connected with the lower handle or open the side lid downward by operating the upper hinge assemblies connected with the upper handle, thereby appropriately determining a direction in which the side lid is opened, depending on the circumstances.

Specifically, the user may open the side lid upward on a rainy day, thereby preventing articles in the accommodating space from getting wet with rain, and the user may open the side lid downward when the user holds articles with both hands or when the user intends to arrange the articles in the accommodating space after placing a light article on the side lid, thereby using the side lid as a shelf.

According to the present inventive concept, when the user operates both of the upper handle and the lower handle at the same time or when the user operates one of the upper handle and the lower handle and then operates the other, the side lid may be completely removed from the vehicle body, such that a traffic line of the user may not be obstructed by the side lid when the user performs work.

The present inventive concept may open and close the side lid by using the hinge assemblies and the handles that have comparatively simple structures, thereby reducing production costs and the number of work processes, and improving marketability of the vehicle by resolving at once dissatisfaction of the user who uses the side lid.

DETAILED DESCRIPTION OF THE EMBODIMENTS

Hereinafter, the present inventive concept will be described in detail with reference to the accompanying drawings so that those skilled in the technical field to which the present inventive concept pertains may easily carry out the present inventive concept. As those skilled in the art would realize, the described embodiments may be modified in various different ways, all without departing from the spirit or scope of the present inventive concept.

A part irrelevant to the description will be omitted to clearly describe the present inventive concept, and the same or similar constituent elements will be designated by the same reference numerals throughout the specification.

Terms or words used in the specification and the claims should not be interpreted as a general and dictionary meaning and should be interpreted as a meaning and a concept which conform to the technical spirit of the present inventive concept based on a principle that an inventor can appropriately define a concept of a term in order to describe his/her own inventive concept by the best method.

Figure 1:
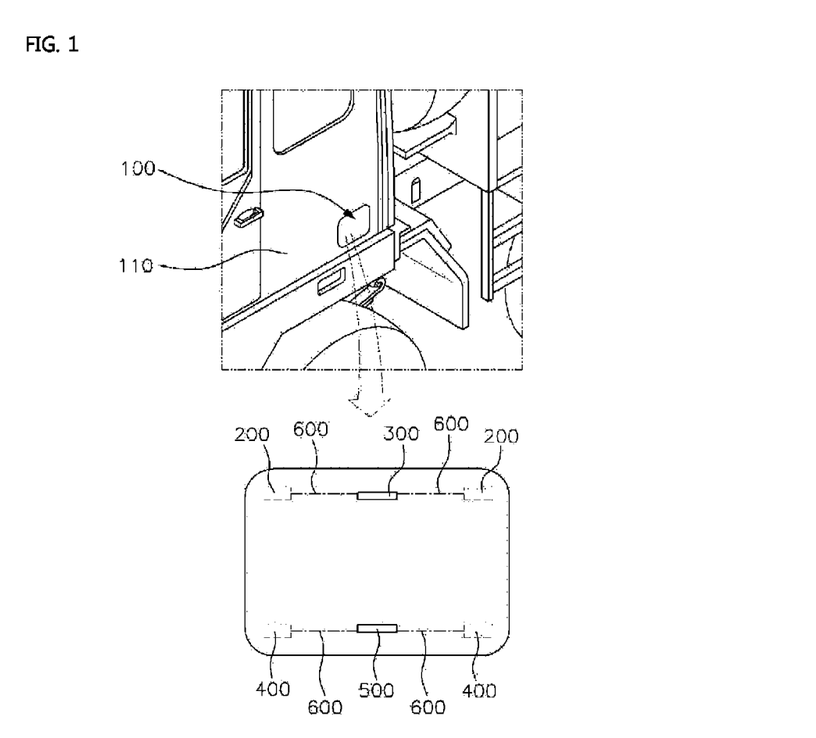
FIG. 1 is a schematic view illustrating a part of a vehicle in which a side lid according to an exemplary embodiment of the present inventive concept is installed.
Figure 2:
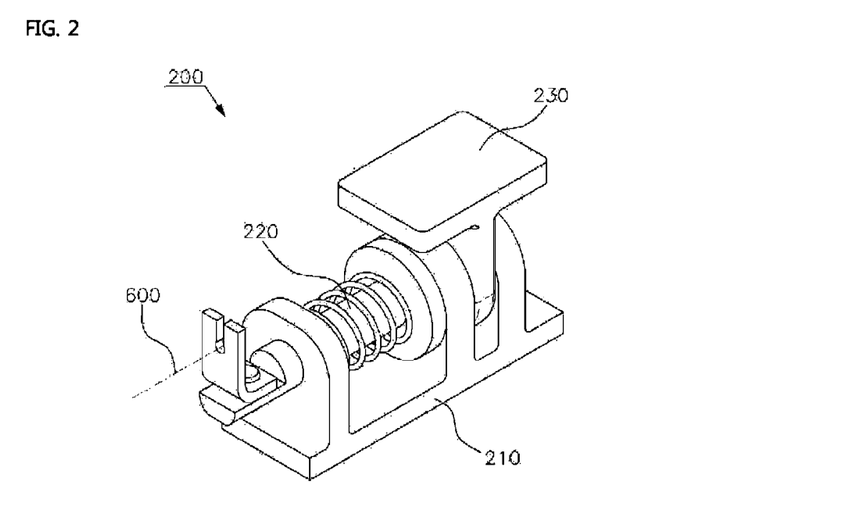
FIG. 2 is a perspective view illustrating an assembled hinge assembly according to an exemplary embodiment of the present inventive concept.
Figure 3:
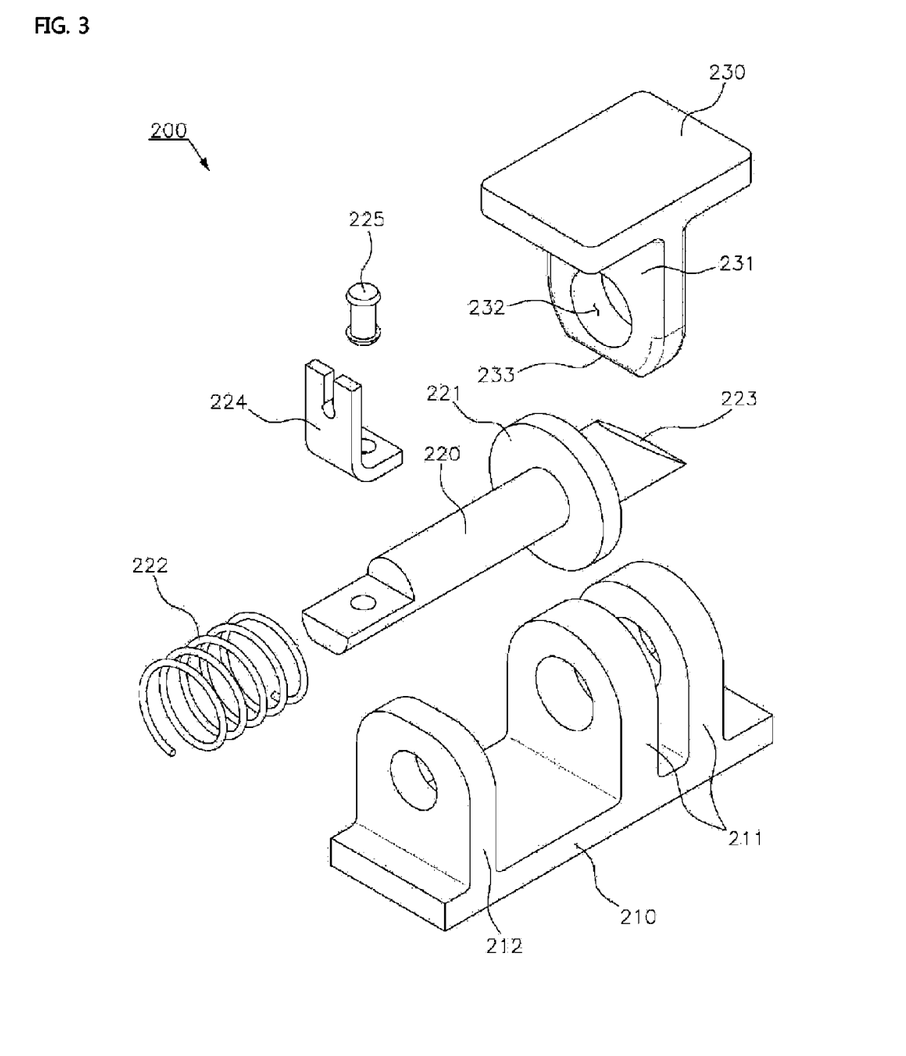
FIG. 3 is an exploded perspective view illustrating a disassembled hinge assembly according to an exemplary embodiment of the present inventive concept.

FIG. 1 is a schematic view illustrating a part of a vehicle in which a side lid according to an exemplary embodiment of the present inventive concept is installed, FIG. 2 is a perspective view illustrating an appearance in which a handle assembly 300 according to an exemplary embodiment of the present inventive concept is assembled, and FIG. 3 is an exploded perspective view illustrating the disassembled handle assembly 300 according to an exemplary embodiment of the present inventive concept.

As illustrated in FIG. 1, an accommodating space (not illustrated) is formed in a lateral side portion of a vehicle body 110 so as to accommodate an article, and the accommodating space is opened or closed by a side lid 100.

Two upper hinge assemblies 200 are coupled to both sides (a left side and a right side) of an upper portion of the side lid 100, and the upper hinge assemblies 200 are connected with an upper handle 300, which is coupled to a center of the upper portion of the side lid 100, by means of cables 600 that are indicated by alternate long and short dash lines in the drawing.

Two lower hinge assemblies 400 are coupled to both sides of a lower portion of the side lid 100, and the lower hinge assemblies 400 are connected with a lower handle 500, which is coupled to a center of the lower portion of the side lid 100, by means of the cables 600.

When a user operates the upper hinge assemblies 200 by manipulating the upper handle 300, the upper portion of the side lid 100 is opened downward while being spaced apart from the vehicle body 110, and when the user operates the lower hinge assemblies 400 by manipulating the lower handle 500, the lower portion of the side lid 100 is opened upward while being spaced apart from the vehicle body 110.

When the user operates both the upper hinge assemblies 200 and the lower hinge assemblies 400 by manipulating the upper handle 300 and the lower handle 500 simultaneously or sequentially, the side lid 100 may be completely removed from the vehicle body 110.

In this case, the upper hinge assemblies 200 and the lower hinge assemblies 400 are symmetrically disposed on the side lid 100 so as to face each other, the upper handle 300 and the lower handle 500 may be installed outside the side lid 100, and the upper hinge assemblies 200 and the lower hinge assemblies 400 may be installed inside the side lid 100.

In an exemplary embodiment of the present inventive concept, the upper hinge assembly 200 and the lower hinge assembly 400 are formed in the same shape, the upper handle 300 and the lower handle 500 are formed in the same shape, and configurations of the hinge assemblies and the handles, which will be described below, are applied to other hinge assemblies and other handles in an identical or similar manner.

As illustrated in FIG. 2, the hinge assembly 200 according to an exemplary embodiment of the present inventive concept may include a female portion 210 which is coupled to the side lid 100 and in which a shaft 220 having one end connected with the cable 600 is slidably accommodated, and a male portion 230 which is coupled to the vehicle body 110 and has a through hole portion 231 that is formed so that the shaft 220 penetrates the through hole portion 231.

When the shaft 220 accommodated in the female portion 210 is penetratively coupled to the through hole portion 231 formed on the male portion 230, the side lid 100 is fixed to the vehicle body 110 and closes the accommodating space, and when the shaft 220 is spaced apart from the through hole portion 231, the side lid 100 is spaced apart from the vehicle body 110 and opens the accommodating space.

Specifically, as illustrated in FIG. 3, the female portion 210 has entry portions 211 that are formed so that the through hole portion 231 formed on the male portion 230 may enter and exit the entry portions 211, and a support portion 212 that is formed to support a spring 222 that provides elastic force to the shaft 220.

The shaft 220 has a protruding portion 221 which is in contact with the entry portion 211 and restricts movement of the shaft, and the spring 222 is installed between the protruding portion 221 formed on the shaft 220 and the support portion 212 formed on the female portion 210 and provides elastic restoring force to the shaft 220.

A bracket 224 to which the cable 600 is connected is coupled, by means of a bracket pin 225, to one end (left end in the illustrated exemplary embodiment) of the shaft 220, and when the cable 600 is pulled or released, the shaft 220 is moved leftward or rightward on the female portion 210.

A through hole 232, which has a diameter that is equal to or relatively and slightly greater than a diameter of the shaft 220, is formed in the through hole portion 231 formed on the male portion 230, and when the male portion 230 enters the female portion 210, the shaft 220 is inserted into the through hole 232.

Figure 4A:
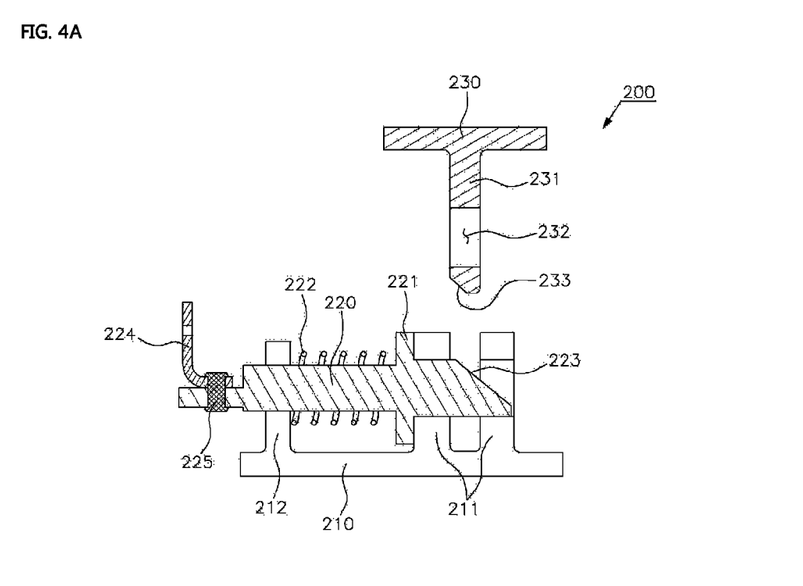
FIG. 4A is a cross-sectional view illustrating a male portion of the hinge assembly spaced apart from a female portion of the hinge assembly according to an exemplary embodiment of the present inventive concept.
Figure 4B:
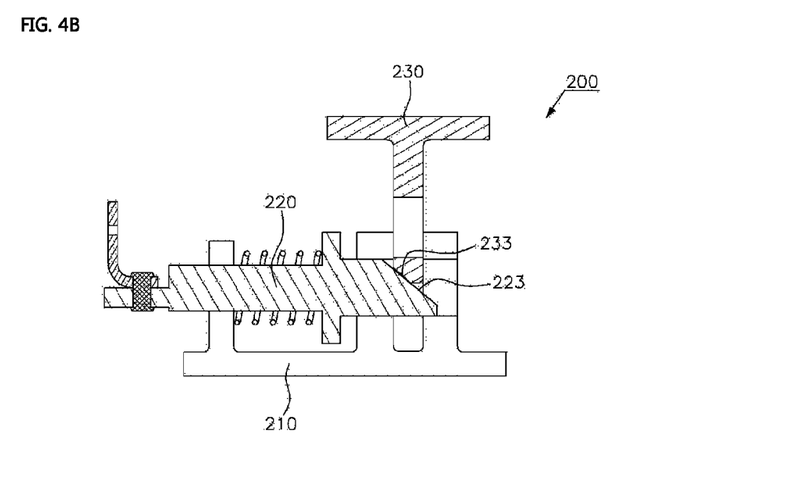
FIG. 4B is a cross-sectional view illustrating the male portion of the hinge assembly enters the female portion of the hinge assembly according to an exemplary embodiment of the present inventive concept.
Figure 4C:
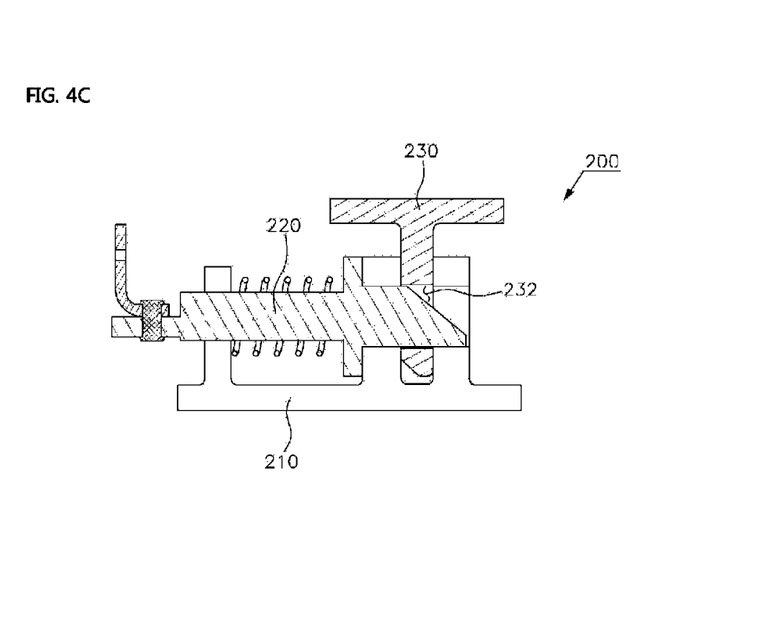
FIG. 4C is a cross-sectional view illustrating the male portion of the hinge assembly completely engaged with the female portion of the hinge assembly according to an exemplary embodiment of the present inventive concept.

FIG. 4A is a cross-sectional view illustrating a configuration in which the male portion is spaced apart from the female portion, FIG. 4B is a cross-sectional view illustrating a configuration in which the male portion enters the female portion, and FIG. 4C is a cross-sectional view illustrating a configuration in which the male portion is completely engaged with the female portion.

As illustrated in FIG. 4A, before the male portion 230 enters the female portion 210, the shaft 220 is moved toward the right side by elastic force of the spring 222, such that the protruding portion 221 is maintained to be in contact with the entry portion 211 of the female portion 210.

In this case, a first inclined surface 223 having a predetermined inclination angle is formed at the other end (right end in the illustrated exemplary embodiment) of the shaft 220, and a second inclined surface 233, which has a shape corresponding to the shape of the first inclined surface 223 of the shaft 220, is formed at an end (lower end in the illustrated exemplary embodiment) of the through hole portion 231 formed on the male portion 230.

When the male portion 230 is spaced apart from the female portion 210, the first inclined surface 223 formed on the shaft 220 is disposed between the entry portions 211 of the female portion 210, and the second inclined surface 233 formed on the male portion 230 may be positioned above the first inclined surface 223.

As illustrated in FIG. 4B, when the male portion 230 enters the female portion 210, the first inclined surface 223 of the shaft and the second inclined surface 233 of the through hole portion come into contact with each other, and the shaft 220 is slowly moved toward the left side while overcoming the elastic force of the spring 222.

As illustrated in FIG. 4C, when the male portion 230 completely enters the female portion 210, the shaft 220 is moved toward the right side again by elastic force of the spring 222, and the end of the shaft 220 is inserted into the through hole 232 formed in the through hole portion 231, such that the vehicle body 110 and the side lid 100 are coupled to each other.

Figure 5:
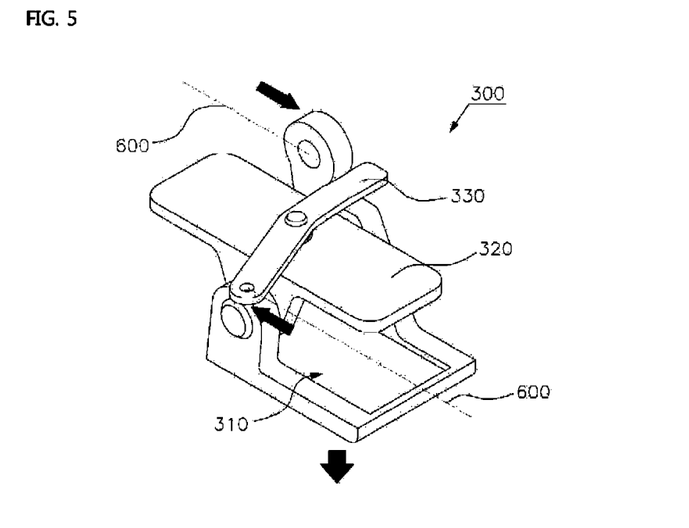
FIG. 5 is a perspective view illustrating an assembled handle according to an exemplary embodiment of the present inventive concept.
Figure 6:
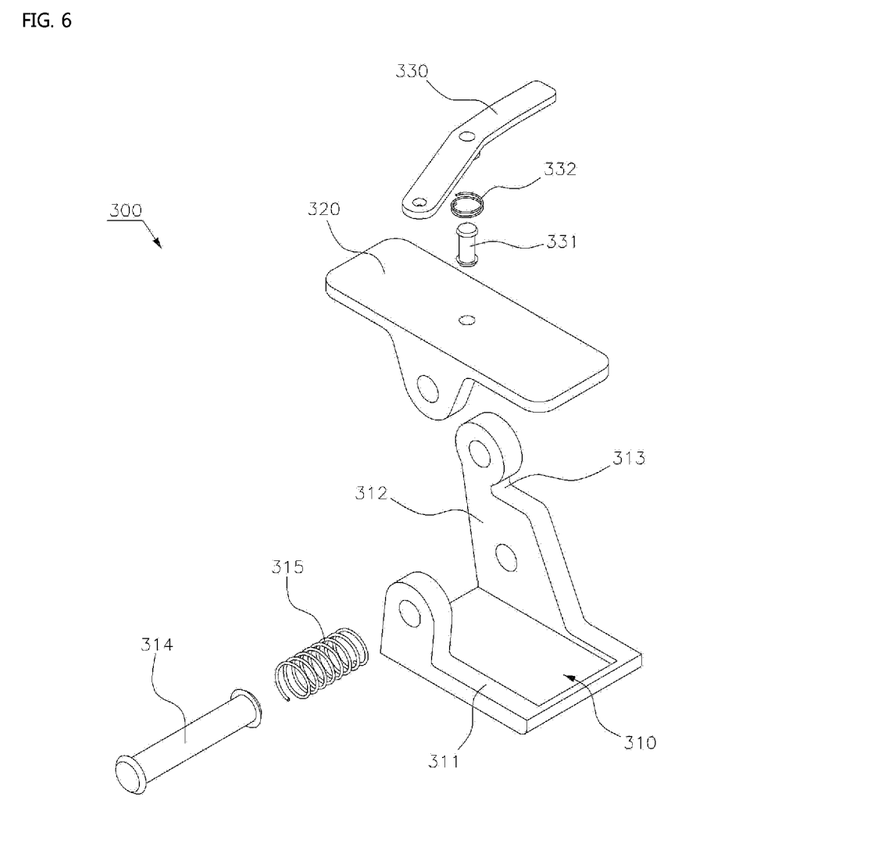
FIG. 6 is an exploded perspective view illustrating the disassembled handle according to an exemplary embodiment of the present inventive concept.
Figure 7:
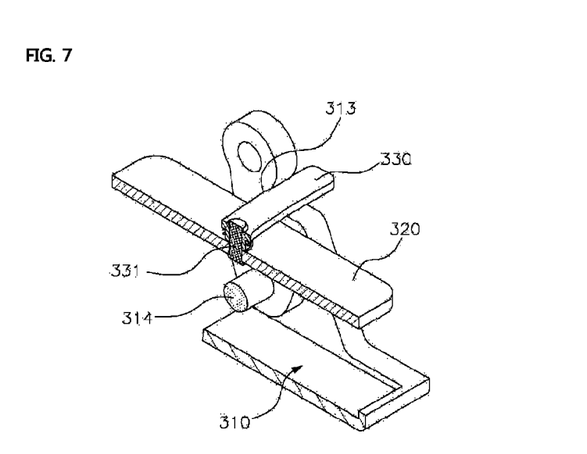
FIG. 7 is a cross-sectional perspective view illustrating a part of the handle illustrated in FIG. 6.
Figure 8:
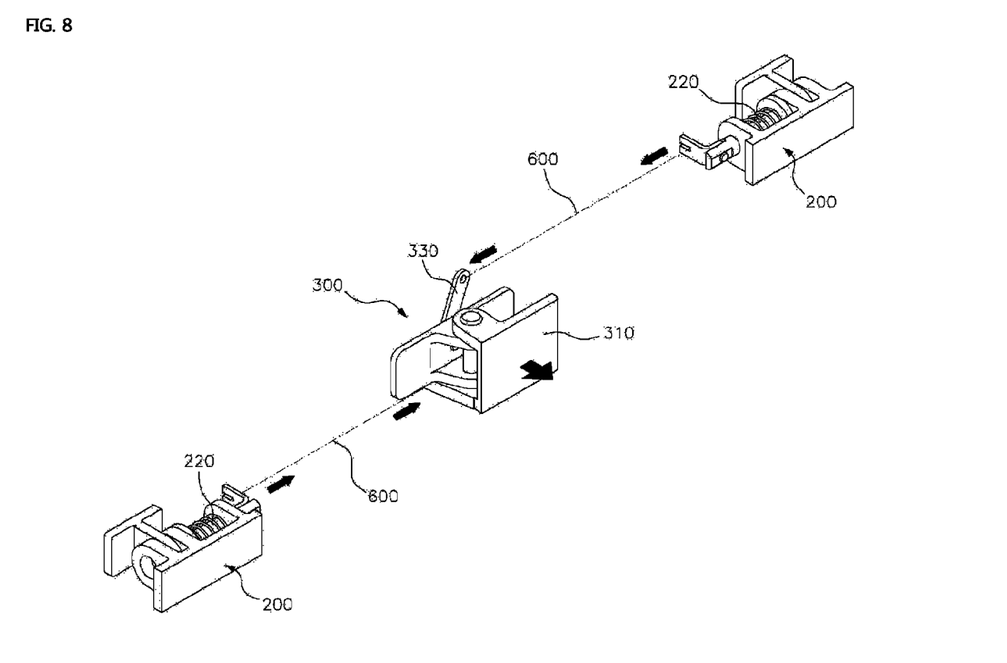
FIG. 8 is a usage state view schematically illustrating the handle connected with the hinge assembly according to an exemplary embodiment of the present inventive concept.

FIG. 5 is a perspective view illustrating an assembled handle according to an exemplary embodiment of the present inventive concept, FIG. 6 is an exploded perspective view illustrating the disassembled handle according to an exemplary embodiment of the present inventive concept, FIG. 7 is a cross-sectional perspective view illustrating a part of the handle illustrated in FIG. 6, and FIG. 8 is a usage state view schematically illustrating the handle connected with the hinge assembly according to an exemplary embodiment of the present inventive concept.

As illustrated in FIGS. 5 and 6, the handle 300 according to an exemplary embodiment of the present inventive concept includes a handle portion 310 which is rotatably connected to one side of a fixing portion 320 coupled to the side lid 100 by means of a handle pin 314, and a lever portion 330 which is coupled to the other side of the fixing portion 320 by means of a lever pin 331, and rotated along with rotation of the handle portion 310, and has one end connected with the cable 600.

Specifically, as illustrated in FIG. 6, the handle portion 310 includes a grip portion 311 which is formed so that the user may hold the grip portion 311 with the hand and may manipulate the grip portion 311, and an extension portion 312 which extends from the grip portion and is connected to the cable 600.

Two holes are formed in the grip portion 311, and the grip portion 311 is coupled to the fixing portion 320 by means of the handle pin 314. A first torsion spring 315 is coupled to the handle pin 314 and provides elastic restoring force to the handle portion 310.

As seen in the illustrated exemplary embodiment, a center of the lever portion 330 is formed to be bent, and a second torsion spring 332 is coupled to the lever pin 331 coupled to the fixing portion 320 and provides elastic restoring force to the lever portion 330.

A recess 313, which has a shape corresponding to the shape of the lever portion 330, is formed to be depressed at one side of the extension portion 312 that extends from the handle portion 310, and the lever portion 330 is rotated while being caught by the recess 313.

Specifically, as illustrated in FIGS. 5 and 8, the handle 300 is connected, by means of the cables 600, with the two hinge assemblies 200 that are disposed to face each other, and the cables 600 are connected to the handle portion 310 and the lever portion 330 of the handle 300, respectively.

When the user holds the handle portion 310 and pulls the handle 300 in a direction of a lower arrow illustrated in FIG. 8, the entire handle portion 310 is rotated about the handle pin, and the extension portion 312 is operated to be rotated in a direction of a right arrow, such that the hinge assembly 200, which is disposed at the left side in FIG. 8, is operated.

At the same time, as the handle portion 310 is rotated, the lever portion 330 is caught by the handle portion and then rotated in a direction of a left arrow illustrated in FIG. 8, such that the hinge assembly 200, which is disposed at the right side in FIG. 8, is operated.

Accordingly, when the user manipulates the upper handle 300 illustrated in FIG. 1, the upper hinge assemblies 200, which are connected with the upper handle 300, are operated, such that the side lid 100 is opened downward, and when the user manipulates the lower handle 500, the lower hinge assemblies 400, which are connected with the lower handle 500, are operated, such that the side lid 100 is opened upward, and whereby depending on the circumstances, the user may appropriately determine a direction in which the side lid is opened.

The aforementioned present inventive concept is not limited to the aforementioned exemplary embodiment and the accompanying drawings, and it will be obvious to those skilled in the technical field to which the present inventive concept pertains that various substitutions, modifications, and changes may be made without departing from the technical spirit of the present inventive concept.

What is claimed is:

1. A structure of a side lid for an accommodating space formed in a vehicle body comprising:
    an upper hinge assembly disposed at an upper portion of the side lid, and connected by an upper cable to an upper handle; and
    a lower hinge assembly disposed at a lower portion of the side lid, and connected by a lower cable to a lower handle,
    wherein the side lid is configured to be opened upward by the lower handle and downward by the upper handle,
    wherein at least one of the upper handle and the lower handle includes:
    a handle portion rotatably connected by a handle pin to a first side of a fixing portion coupled to the side lid; and
    a lever portion coupled to a second side of the fixing portion by a lever pin so as to be rotated when the handle portion is rotated and having an end connected to the upper cable or the lower cable.

2. The structure of claim 1, wherein at least one of the upper hinge assembly and the lower hinge assembly includes:
    a female portion coupled to the side lid and comprising a shaft having a first end connected to the cable, the shaft being slidably accommodated in the female portion; and
    a male portion coupled to the vehicle body and having a through hole portion formed to accommodate the shaft.

3. The structure of claim 2, wherein a first inclined surface having an inclination angle is formed at a second end of the shaft, and a second inclined surface having a shape corresponding to a shape of the first inclined surface is formed at an end of the male portion.

4. The structure of claim 1, wherein a recess, having a shape corresponding to a shape of the lever portion, is formed at one side of an extension portion that extends from the handle portion.

* * * * *